Patented July 31, 1945

2,380,617

UNITED STATES PATENT OFFICE 2,380,617

HEAVY METAL CATALYSTS FOR EMULSION POLYMERIZATION REACTIONS

William D. Stewart and Benjamin M. G. Zwicker, Akron, Ohio, assignors, by mesne assignments, to The B. F. Goodrich Company, Akron, Ohio, a corporation of New York No Drawing. Application October 13, 1941, Serial No. 414,788

10 Claims. (Cl. 260—84.5)

This invention relates to the polymerization of unsaturated organic compounds which are capable of undergoing an addition polymerization to form high molecular weight linear polymers, and particularly to the polymerization in the form of an aqueous emulsion of a butadiene either alone or in admixture with a monomer copolymerizable therewith. The principal object of the invention is to provide a method for decreasing the time required to effect such polymerization reactions.

It has already been disclosed in the copending applications of William D. Stewart, Serial Nos. 379,712 to 379,717 inclusive filed February 19, 1941, that the time required to effect polymerization reactions can be greatly reduced by the use of heavy metal catalysts. The heavy metal catalyst may be in the form of a simple ionizable heavy metal salt in which case extremely small amounts such as from .001% to .01% by weight of catalyst based on the monomers are employed, the optimum amount depending upon the particular metal used. The heavy metal catalyst may also be in the form of a heavy metal complex wherein the metal is united to another element by coordinated covalences rather than by primary valences. These heavy metal complexes, called redox systems because of their property of catalyzing oxidation-reduction reactions, may contain heavy metals such as copper, cobalt, iron, or nickel associated with complex-forming compounds such as pyrophosphates, aliphatic carboxylic acids, hydroxy-substituted aliphatic mercaptans, aliphatic polyhydroxy compounds or sterols. Heavy metal complexes may be employed in considerably higher proportions than simple heavy metal salts since the heavy metal is present in a practically unionized form. Amounts between .1% and 1% by weight of the heavy metal complexes based on the monomers present are in general suitable.

The term heavy metal is used herein to signify metals which have a density greater than four, an atomic weight greater than forty and a low atomic volume (ratio of atomic weight to density) and consequently appear at the minimum points above an atomic weight of forty on Lothar Meyer's atomic volume curve. (See Ephraim "Textbook of Inorganic Chemistry" page 30 or Cavén and Lander "Systematic Inorganic Chemistry" facing page 30.) The metals appearing in the center positions of the long periods of a periodic table arranged in long and short periods, and especially those which occur in the 6th to 12th positions of the long periods (considering the alkali metals to occupy the first position and all the rare earth metals to occupy a single position), that is, the metals of Group VIII, subgroup B of Groups I and II and subgroup A of Groups VI and VII of Mendeleef's Periodic Table, are thus included in the term heavy metal. The metals of Group VIII, particularly those Group VIII metals occurring in the first long period, specifically iron cobalt and nickel, are preferred heavy metals for use in polymerization catalysts.

We have now discovered that the time required to effect polymerization reactions may be further decreased by using a heavy metal catalyst comprising at least two heavy metals. When the method of this invention is employed, it is possible to complete polymerization reactions in a much shorter time than when either of the heavy metal catalysts is employed alone. Furthermore, the polymers produced by the method of this invention exhibit excellent properties despite the short periods of time required to effect the polymerizations.

The preferred manners of practicing this invention will be shown by the following specific examples which illustrate rather than limit the invention.

Example 1

A mixture of 11 parts by weight of butadiene and 9 parts of acrylonitrile was agitated at 30° C. in the presence of about 20 parts of a 2% aqueous solution of a sodium alkyl naphthalene sulfonate as an emulsifying agent, .09 part of diisopropyl dixanthogen as a modifier, and .05 part of hydrogen peroxide as an initiator, and a heavy metal catalyst. The catalysts employed and the times required for the polymerization are recorded in the following table:

| Parts by weight | Catalyst | Time |
|---|---|---|
| 0.15 | $Na_4P_2O_7 \cdot 10H_2O$ | ¾ completed in 40 hours. |
| 0.0002 | $CoCl_2 \cdot 2H_2O$ | |
| 0.16 | $Na_4P_2O_7 \cdot 10H_2O$ | Complete in 30 hours. |
| 0.0064 | $Fe_2(NH_4)_2(SO_4)_4 \cdot 24H_2O$ | |
| 0.16 | $Na_4P_2O_7 \cdot 10H_2O$ | |
| 0.0064 | $Fe_2(NH_4)_2(SO_4)_4 \cdot 24H_2O$ | Complete in 22 hours. |
| 0.0002 | $CoCl_2 \cdot 2H_2O$ | |

It will be observed that the polymerization effected in the presence of the third catalyst was considerably faster than those conducted in the presence of either cobalt or iron alone. It was further found that the mixed heavy metal catalyst gave a faster polymerization than was obtainable by the use in this recipe of any amount of either the cobalt or iron compounds alone. The product obtained by coagulating and drying the latex obtained by the polymerization in the presence of the mixtures of heavy metals was plastic and could be easily worked on the mill. The vulcanizates prepared therefrom had excellent tensile strength and elongation and had a high resistance to oils, greases, and other deteriorating influences.

*Example II*

A mixture of 7 parts by weight of butadiene and 3 parts of methyl acrylate was agitated at 35° C. in the presence of about 25 parts of a 2% aqueous solution of myristic acid which had been 95% neutralized with sodium hydroxide, .035 part of hydrogen peroxide as an initiator, .04 part of diisopropyl dixanthogen as a modifier, and a catalyst containing 0.13 part of $Na_4P_2O_7 \cdot 10H_2O$, 0.00025 part of $CoCl_2 \cdot 2H_2O$ and 0.007 part of $Fe_2(SO_4)_3 \cdot 9H_2O$. The reaction was complete in 27 hours. The rubber obtained by coagulating and drying the latex in the usual manner was plastic and could be easily worked on a mill. The vulcanizates obtained from the polymer had good tensile strength, high elongation, and were particularly suitable for use in tires because of their low hysteresis.

*Example III*

A mixture of 7 parts by weight of butadiene and 3 parts of styrene was agitated at 40° C. in the presence of about 25 parts of a 2% aqueous solution of myristic acid which had been 95% neutralized with sodium hydroxide as an emulsifying agent, 0.036 part of hydrogen peroxide as an initiator, 0.045 part of diisopropyl dixanthogen as a modifier, and a heavy metal catalyst. The following table shows the catalysts employed and the times required for the polymerizations.

| Parts by weight | Catalyst | Time |
|---|---|---|
| 0.05 | $Na_4P_2O_7 \cdot 10H_2O$ | |
| 0.005 | $Fe_2(SO_4)_3 \cdot 9H_2O$ | } Complete in 19 hours. |
| 0.05 | $Na_4P_2O_7 \cdot 10H_2O$ | |
| 0.0005 | $CoCl_2 \cdot 2H_2O$ | } ¾ complete in 19 hours. |
| 0.05 | $Na_4P_2O_7 \cdot 10H_2O$ | |
| 0.005 | $Fe_2(SO_4)_3 \cdot 9H_2O$ | |
| 0.0005 | $CoCl_2 \cdot 2H_2O$ | } Complete in 14 hours. |

It will be observed that the use of two heavy metal catalysts greatly accelerated the polymerization. The polymer obtained by working up the latex obtained in 14 hours was plastic and readily workable on a roll mill, and resembled natural rubber to a marked degree. Vulcanizates prepared from the rubber were strong and elastic, and could be used as a general replacement for natural rubber.

*Example IV*

A mixture of 7 parts of butadiene and 3 parts of styrene was agitated at 40° C. in the presence of about 25 parts of a 2% aqueous solution of myristic acid which had been 95% neutralized with sodium hydroxide, 0.025 part of hydrogen peroxide, 0.045 part of diisopropyl dixanthogen, and a catalyst. When a mixture of 0.005 part of $Fe_2(SO_4)_3 \cdot 9H_2O$ and 0.13 part of $$Na_4P_2O_7 \cdot 10H_2O$$

was employed as the catalyst the reaction required 22 hours, but when 0.00025 part of $CoCl_2 \cdot 2H_2O$ were included in the recipe together with the iron, the polymerization required only 11 hours. This is a much faster polymerization than can be achieved in this recipe with a mixture of cobaltous chloride and sodium pyrophosphate in the absence of a second heavy metal compound.

*Example V*

When 0.001 part of $Ni(NH_4)_2(SO_4)_2 \cdot 6H_2O$ was substituted for the cobaltous chloride in Example IV, the polymerization required 15 hours, a period of time considerably shorter than can be obtained by the use in the above recipe of nickel alum in the absence of another heavy metal.

*Example VI*

Instead of the pyrophosphate complex employed in Example IV, a mixture of 0.003 part of $Fe_2(NH_4)_2(SO_4)_4 \cdot 24H_2O$ and 0.025 part of serine was employed as the heavy metal catalytic system. The polymerization was complete in 76 hours at 30° C. When 0.0001 part of $CoCl_2 \cdot 2H_2O$ and 0.00025 part of $ZnSO_4 \cdot 7H_2O$ were added in addition to the ferric alum and serine, the time required to complete the polymerization was reduced to 60 hours.

*Example VII*

When Example IV was repeated with the substitution of 0.003 part of $Fe_2(NH_4)_2(SO_4)_4 \cdot 24H_2O$ and 0.025 part of glutathione for the pyrophosphate complex, the polymerization required 87 hours at 30° C. Addition of 0.001 part of $$CuSO_4 \cdot 5H_2O$$

to the glutathione complex reduced the time required to complete the polymerization to 76 hours.

*Example VIII*

A mixture of 5.5 parts of butadiene and 4.5 parts of acrylonitrile was agitated at 30° C. in the presence of about 25 parts of a 2% aqueous solution of myristic acid which had been 85% neutralized with sodium hydroxide, 0.06 part of diisopropyl dixanthogen, and 0.035 part of hydrogen peroxide. When a mixture of 0.005 part of $Fe_2(SO_4)_3 \cdot 9H_2O$ and 0.025 part of sorbitol was employed as a catalyst, the polymerization required 21 hours. When 0.0005 part of $CoCl_2 \cdot 2H_2O$ were employed in addition to the iron, the polymerization required only 16 hours.

*Example IX*

When mixture of 0.005 part of $Fe_2(SO_4)_3 \cdot 9H_2O$ and 0.05 part of cholesterol was substituted for the sorbitol complex in Example VIII, the polymerization required 25 hours. Inclusion of 0.0005 part of $CoCl_2 \cdot 2H_2O$ in addition to the iron-cholesterol complex reduced the time required to effect the polymerization to 21 hours.

Although the preferred method of polymerization is by an emulsion polymerization as set forth in the specific examples, the heavy metal catalysts herein described may be employed in polymerization in homogeneous systems in the presence or absence of solvents or diluents in the manners well known to the prior art.

The best results are ordinarily obtained when a complex-forming compound is present together with the mixture of heavy metal compounds as shown above. An enhancement of catalytic activity is also obtained by the use of mixtures of simple heavy metal salts in the absence of any complex-forming compound. Such a process, while not preferred, is accordingly within the broad scope of our invention.

The optimum amounts in each case depend somewhat upon the specific heavy metal and the specific complex-forming compound employed.

The use of too great amounts of any of the heavy metal compounds will tend to retard the polymerization, copper and manganese having particularly pronounced tendencies to retard the polymerization when used in excess. It will ordinarily be found that the systems will tolerate larger amounts of heavy metal compounds when a complex-forming compound is present. The optimum amount of catalyst also depends somewhat upon the monomers undergoing polymerization.

A particularly useful heavy metal catalyst which works well under a wide variety of conditions is a mixture of from about 0.002 to 0.01% of iron in the form of a water-soluble salt, from about 0.0035 to 0.035% of cobalt in the form of a water-soluble salt, and from about 0.1 to 1.5% of an alkali metal pyrophosphate, all based on the polymerizable materials. The iron may be provided by adding from about 0.01 to 0.05% of $Fe_2(SO_4)_3 \cdot 9H_2O$, the cobalt by adding from about 0.001 to 0.01% of $CoCl_2 \cdot 2H_2O$. The amounts of other water soluble iron and cobalt salts required to make such a heavy metal catalyst can readily be calculated. Another excellent heavy metal catalyst may be obtained by substituting nickel for the cobalt in the above combination in about the same amounts.

The expression "heavy metal catalyst" is used herein to signify the catalytic combination of compounds of heavy metals and complex-forming compound, if the latter is employed. The catalysts are preferably water-soluble, by which is meant that the whole catalytic system will dissolve in the amount of water used in the recipe. Even catalysts which do not completely dissolve in the water may be employed, but their use is not preferred.

The catalytic combinations of this invention may be employed in the polymerization of any unsaturated organic compounds which are capable of undergoing an addition polymerization to form a high molecular weight linear polymer. Included in this class of monomers are the butadienes-1,3 such as butadiene-1,3 (commonly termed butadiene) isoprene, 2,3-dimethyl butadiene, piperylene, and chloroprene; aryl olefins such as styrene, vinyl naphthalene, and alpha-chlorostyrene; acrylic and alpha-substituted acrylic acids, esters, nitriles, and amides such as acrylic acid, acrylonitrile, alpha-methacrylonitrile, alpha-chloracrylonitrile, methyl acrylate, methyl methacrylate, methacrylamide; vinyl halides, esters, ethers, and ketones such as vinylidene chloride, vinyl chloride, vinyl acetate, methyl isopropenyl ketone, and methyl vinyl ether. Any of the above compounds all of which contain a

group, may also be copolymerized with monomers copolymerizable therewith. Butadiene, for instance, may be copolymerized with one or more monomers which enter into the polymeric chains by 1,2-addition such as acrylonitrile, styrene, methyl acrylate, etc.

As emulsifying agents which may be employed in emulsion polymerizations may be mentioned soaps such as sodium oleate, potassium palmitate, and sodium myristate, synthetic saponaceous materials including hymolal sulfates and alkaryl sulfonates such as sodium lauryl sulfate and sodium isopropyl naphthalene sulfonate, and salts of organic bases containing long carbon chains such as the hydrochloride of diethylaminoethyloleylamide, trimethylcetylammonium methyl sulfate, the hydrochloride of oleylamidoethyldimethylamine, and the hydrochloride of the diethylaminoethoxyanilide of oleic acid. The soaps are employed in polymerizations under basic conditions, the salts of organic bases under acid conditions, and the synthetic saponaceous materials under acid, alkaline, or neutral conditions.

The polymerization may be effected by various known initiators of polymerization such as percompounds including hydrogen peroxide, benzoyl peroxide, ammonium persulfate, potassium persulfate, and other peroxides and persalts such as persulfates, perborates, percarbonates, and the like, as well as other types of initiators such as diazoaminobenzene, sulfur dioxide, hyposulfites, bisulfites, dipotassium diazomethane disulfonate, and triphenylmethylazobenzene. The polymerization, particularly if conducted homogeneously, may also be initiated by actinic radiation.

The plasticity and solubility of the polymers produced by homogeneous polymerizations may be increased by including in the charge chlorinated compounds such as carbon tetrachloride and trichloracetic acid, while a corresponding effect can be obtained in emulsion polymerizations through the use of sulfur-containing compounds such as the dialkyl dixanthogens, the higher tetraalkyl mono- and polysulfides, mercaptoalkylthiazoles, etc.

Other methods and procedures known to be useful in connection with the polymerization of unsaturated organic compounds are within the spirit and scope of the invention as defined in the appended claims.

We claim:

1. The method which comprises polymerizing in the form of an aqueous emulsion a mixture of butadiene and a monomer copolymerizable therewith in aqueous emulsion, in the presence of catalytic amounts of water-soluble salts of iron and cobalt and a water-soluble pyrophosphate.

2. The method of claim 1 in which acrylonitrile is employed as the monomer.

3. The method of claim 1 in which styrene is employed as the monomer.

4. The method which comprises polymerizing in the form of an aqueous emulsion a mixture of butadiene and a monomer copolymerizable therewith in aqueous emulsion, in the presence of catalytic amounts of water-soluble salts of iron and nickel and a water-soluble pyrophosphate.

5. The method of claim 4 in which styrene is the monomer.

6. The method which comprises polymerizing in aqueous emulsion a mixture of butadiene and a monomer copolymerizable therewith in aqueous emulsion, in the presence of catalytic amounts of water-soluble salts of two heavy metals each of which is a heavy metal occurring in Group VIII and the first long period of the periodic table, and also in the presence of a water-soluble pyrophosphate.

7. The method which comprises polymerizing in aqueous emulsion a mixture of butadiene and a monomer copolymerizable therewith an aqueous emulsion, in the presence of a catalytic amount of a water-soluble heavy metal catalyst comprising two heavy metals each of which is a heavy metal occurring in Group VIII and the first long period of the periodic table.

8. The method which comprises polymerizing in aqueous emulsion a mixture of butadiene and a monomer copolymerizable therewith in aqueous emulsion, in the presence of a water-soluble heavy metal catalyst comprising two heavy metals each of which is a heavy metal occurring in Group VIII and the first long period of the periodic table, the amount of the said catalyst being less than about 1% by weight based on the mixture polymerized and such that no more than about 0.001 to .01% by weight of each of the said heavy metals is present in the form of heavy metal ions.

9. The method which comprises polymerizing in aqueous emulsion an unsaturated organic compond which contains a

group and which undergoes in aqueous emulsion an addition polymerization to form a high molecular weight linear polymer, in the presence of a catalytic amount of a water-soluble heavy metal catalyst comprising two heavy metals each of which is a heavy metal occurring in Group VIII and the first long period of the periodic table.

10. The method which comprises polymerizing in aqueous emulsion an unsaturated organic compound which contains a

group and which undergoes in aqueous emulsion an addition polymerization to form a high molecular weight linear polymer, in the presence of catalytic amounts of water-soluble salts of two heavy metals each of which is a heavy metal occurring in Group VIII and the first long period of the periodic table, and also in the presence of a water-soluble pyrophosphate.

WILLIAM D. STEWART.
BENJAMIN M. G. ZWICKER.